(No Model.)
E. M. McVICKER.
CHECK ROW ATTACHMENT FOR CORN PLANTERS.
No. 285,293. Patented Sept. 18, 1883.
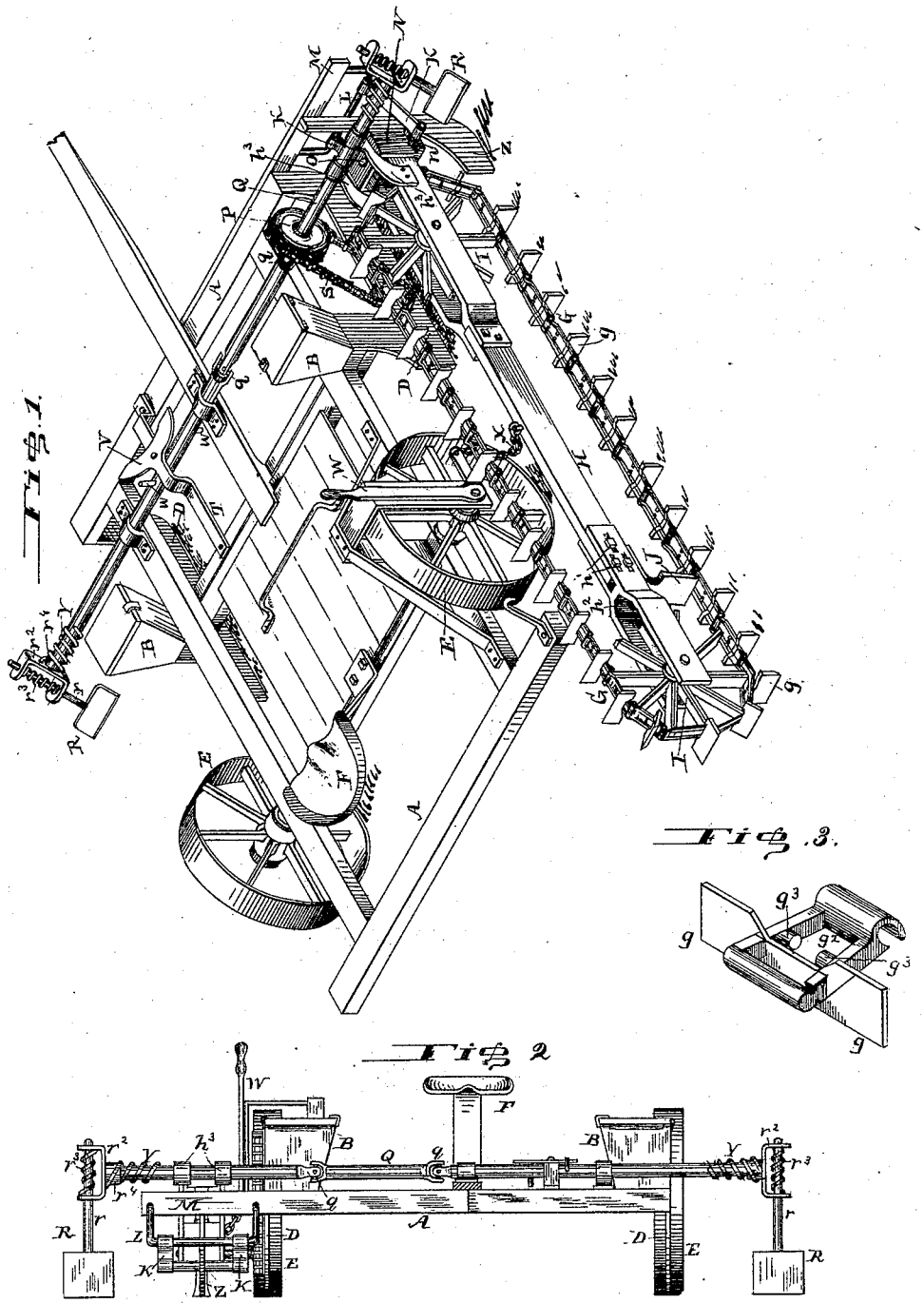
Witnesses
C. J. Bett
W. C. Shaffer
Inventor
Emery M. McVicker
By Paine & Ladd,
Attorneys.

UNITED STATES PATENT OFFICE.

EMERY M. McVICKER, OF RIPON, WISCONSIN.

CHECK-ROW ATTACHMENT FOR CORN-PLANTERS.

SPECIFICATION forming part of Letters Patent No. 285,293, dated September 18, 1883.

Application filed June 5, 1883. (No model.)

*To all whom it may concern:*

Be it known that I, EMERY M. McVICKER, a citizen of the United States, residing at Ripon, in the county of Fond du Lac and State of Wisconsin, have invented certain new and useful Improvements in Check-Row Attachments for Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of corn-planters in which is employed an endless chain or belt that travels in contact with the ground and serves to actuate the seed-dropping devices. In corn-planters of this description it has been customary to mount the traction-chain in a frame or support which is combined with devices for lowering and raising the chain to throw it in and out of operation, but no provision has ever been made for permitting the traction chain or belt to automatically adjust itself to the inequalities or undulations of the ground, and to enable the frame of the planter to move laterally or vertically without causing any deviation in the course of the chain over the ground. The self-adjustment of the traction-chain, or its equivalents, constitutes the essential feature of my invention, the object thereof being to deposit the seed at regular intervals apart, or to "check-row" the corn in a more accurate manner than has heretofore been possible with corn-planters employing endless traction chains or belts. The invention also involves details of construction and arrangement, which will be more fully described hereinafter, and then set forth in the claims.

In the drawings, Figure 1 is a perspective view of a corn-planter having my check-row attachment applied thereto. Fig. 2 is a front view of my check-row attachment, exhibiting more fully the colter or runner preceding the traction-chain. Fig. 3 is a detached view of one of the links of the chain.

I have in the present instance shown my invention or attachment when applied to a corn-planter of the customary construction, the letter A designating the main frame; B, the seed-boxes; D, the runner-shaped furrow-openers; E, the transporting-wheels, and F the driver's seat.

The attachment for check-rowing corn or depositing the seed in hills located at regular intervals apart comprises the endless chain, belt, or rope G, its supporting beam or frame H, the guide-wheels I, and devices for suspending said beam from the planter-frame in such a manner that the beam and chain can rise and fall independently of the planter-frame, and the latter also move vertically and laterally without changing the position of the chain in relation to the ground, or causing any deviation from the course it should follow to properly and uniformly plant the seed.

The endless chain preferably employed by me consists of open links which have transverse bars and hooks adapted to interlock with each other, the links composing the chain being formed or cast with transverse spades or plates $g$, which project from the outer sides of said links and act as biting-surfaces for insuring the necessary traction or adhesion of the chain upon the ground, and consequently preventing the slipping of the chain.

The guide-wheels I are constructed of hubs and radial spokes—or, in other words, they are skeleton wheels devoid of rims. These wheels are fitted and turn in forks or branched ends of the beam H, and the arms or spokes thereof receive openings $g^2$, formed in the link by projections $g^3$, these openings being just large enough to hold the ends of the arms or spokes and prevent the chain from slipping.

The above-described chain need not necessarily be employed in every instance, because an ordinary open-link chain might work satisfactorily when employed; and, furthermore, it is obvious that an endless belt or band, or even a rope, can be resorted to for operating the seeding devices.

The skeleton or rimless wheels are employed because they prevent the accumulation of earth thereon, and preserve the proper or normal diameters or dimensions of the surfaces over which the chain passes.

A scraper-blade, J, projects from a support on the under side of the beam H, near the rear guide-wheel, and serves to remove all clods of earth adhering to the chain, as will readily be apparent. The beam is made adjustable, so that the proper tension can be given to the chain, and this I accomplish by making one of the forked ends with flanges, which embrace the middle section of the beam, and the bolts which fasten the flanges pass through slots $h'$. The end of the screw-bolt $h^2$ bears against the end of the middle section of a beam, and after the guide-wheels have been adjusted to the proper distance by means of this screw the bolts $h'$ are tightened.

The devices for connecting the beam H and traction-chain to the planter-frame consist of the arms or hanger K, having eyes at its front and rear ends, which receive, respectively, a fulcrum-rod or fixed pintle, L, on an arm, M, projecting laterally from the planter-frame, and pintles or gudgeons $n$ on the sides of a yoke or clevis, N. The front end of the beam H fits into said clevis or yoke, and is connected thereto by a vertical pin, O, which serves as a pivot to permit the planter-frame and the aforesaid hanger and clevis to assume an oblique position in relation to the chain and its beam. The pivotal connection of the yoke or clevis N to the hanger K will also enable the beam and its chain to rise and fall independently of the planter-frame, so as to cause the traction-chain to adapt itself to the inequalities or undulations of the ground. The pivotal connection between the hanger K and rod or pintle L on the planter-frame, or on an arm, M, attached thereto and projecting therefrom, will permit the planter-frame to rise and fall without affecting the position of the chain upon the ground. On the front end of the beam H are two brackets or plates, $h^3$, which receive a transverse shaft, Q, and act as bearings for the same. This shaft is made in three sections, the two outer sections carrying marking-spades R, and the middle section being connected thereto by means of universal or gimbal joints $q$. The section of the shaft adjoining the traction-chain has a pulley, $p$, over which and a pulley on the shaft of the front traction-chain wheel, passes a belt or chain, S, for transmitting motion to the jointed shaft. The function of this jointed shaft is to actuate the seed-dropping slide through the intervention of the horizontally-vibrating lever V, which has a T-shaped head at its fulcrum end, and has its long arm connected with the seed-slide by an arm, T. The lever V is fulcrumed on a bracket of the planter-frame, and is engaged by two tappets, $w$, on the jointed shaft, which alternately strike the opposite sides of the head of the lever, and thus serve to move the seed-slide back and forth. The marking-spades R, carried by the outer or end sections of the jointed shaft, have shanks or stems $r$, which pass through yokes $r^2$ on the ends of the jointed shaft, and are encircled by springs $r^3$ between the plates of said yokes. It will be understood that as the shaft revolves the spades periodically strike the ground and produce marks for indicating the position of the succeeding hills of corn. The spring-encircled shanks will permit the marking-spades to adjust themselves to the movement of the revolving shaft and planter and the inequalities of the ground. In addition to the movement of the marking-spades at right angles to the jointed shaft, rendered possible by means of the aforesaid spring-shanks, I mount the yokes $r^2$ on the shaft in such a manner that they can have an axial or rotary movement thereon. For this purpose the yokes $r^2$ have collars or sleeves $r^4$, which fit loosely on the shaft, and are connected thereto by means of spiral or coiled springs Y, the inner and outer or the end coils of said springs being respectively secured to the collars $r^4$ and the jointed shaft. It will be manifest that when the jointed shaft and its marking-spades are revolving at a certain degree of speed, communicated thereto by the traction-chain, the collars or sleeves $r^4$, are held by the springs in their normal positions; and when the marking-spades strike any immovable obstacle the collars $r^4$ will permit the marking-spades to turn on the shaft until the obstacle is passed. Were it not for the presence of the springs V and collars $r^4$ the traction-chain might at times be caused to slip or some part would break.

It will be seen that the pivotal connection of the hanger with the planter-frame by means of the stationary fulcrum-rod, and with the clevis or yoke by means of the gudgeons or journals on the latter, will allow the planter-frame to rise or fall or move vertically without disturbing the position of the traction-chain or removing it from contact with the ground. The beam or frame carrying the traction-chain is itself free to move vertically by reason of the pivotal connection between the hanger and clevis or yoke; and any oblique movement or lateral swerving of the planter will bring the vertical pivot-pin into action and permit hanger and clevis to move laterally with the planter-frame, thus always maintaining the traction-chain in a straight line, no matter what position the planter may assume, consequently enabling the corn to be planted in accurate check-rows. The double-jointed shaft will allow these movements of the planter-frame and traction-chain to take place without throwing the intermediate power-transmitting chain or belt out of gear or otherwise affecting the free and easy operation of the various parts.

For the purpose of elevating the traction-chain and its beam or frame, I provide an elbow-lever, W, which is pivoted to the planter-frame within easy reach of the driver, and is connected with the beam of the traction-chain by means of a flexible connection or chain, $x$. This connection $x$ will allow the parts to automatically adjust themselves in the manner above indicated. Instead of the lever and chain, I may employ any other appropriate device for producing a like result. I produce a sufficiently-even surface of the ground for the traction-chain to travel over by locating in advance thereof a colter or runner, Z, which is attached to the planter-frame at its front end, and is properly braced by a horizontal arm. This colter or runner serves to break up clods or other obstructions and remove trash that might lodge in front of the traction-chain.

Having thus described my invention, what I claim as new, and desire to secure by Letters Patent, is—

1. A check-rowing attachment for corn-planters, consisting of an endless traction chain, belt, or rope, a beam or support having guides or wheels for said chain or its equivalent, and flexible joints or coupling devices, substantially as herein shown, for connecting the support of said chain to a planter-frame, and permitting the latter to move vertically and swerve laterally without affecting the position of the chain upon the ground, as and for the objects stated.

2. A check-rowing attachment for corn-planters, consisting of the beam H, skeleton wheels I, endless chain G, pivoted hanger K, pivoted clevis or yoke N, and pivot-pin O, as and for the purpose set forth.

3. The sectional longitudinally-adjustable beam H, and the wheels I, and chain, belt, or rope G, mounted therein, in combination with devices for hanging said beam on a planter-frame, as and for the purpose set forth.

4. An endless traction-chain for a check-row corn-planter, consisting of open links having vertical ribs or plates $g$, and inner projections integral with said links, in combination with the supporting-frame and the skeleton wheels mounted therein, substantially as and for the purpose set forth.

5. In a check-row attachment for corn-planters, the combination of a jointed shaft having marking-spades, and a suitable device for communicating motion thereto, with a traction-chain, a self-adjusting supporting beam or frame, and intermediate device for communicating motion from the shaft of said traction-chain to the jointed shaft, substantially as herein set forth.

6. In a check-row corn-planter, the combination of the rotary shaft, the marking-spades, the yokes or supports for the same fitted loosely on said rotary shaft, and the springs for connecting the spade-yokes to the rotary shaft, with means for communicating motion to the rotary shaft, substantially as herein set forth.

7. The combination of the scraper-blade with the endless traction chain or belt and the supporting-beam for cleaning said chain or belt or preventing the lodgment of trash thereon, substantially as herein set forth.

In testimony whereof I affix my signature in presence of two witnesses.

EMERY M. McVICKER.

Witnesses:
JAS. J. MORRILL,
C. T. BELT.